(12) United States Patent
Zheng et al.

(10) Patent No.: US 7,037,966 B2
(45) Date of Patent: May 2, 2006

(54) STAIN RESISTANT COATING

(75) Inventors: Min Zheng, Norristown, PA (US);
Kurt Wood, Abington, PA (US);
Lonnie Bryant, Kyoto (JP)

(73) Assignee: Arkema Inc., Philadelphia, PA (US)

( * ) Notice: Subject to any disclaimer, the term of this patent is extended or adjusted under 35 U.S.C. 154(b) by 0 days.

(21) Appl. No.: 10/874,783

(22) Filed: Jun. 23, 2004

(65) Prior Publication Data
US 2005/0288413 A1    Dec. 29, 2005

(51) Int. Cl.
*C08K 3/10*    (2006.01)
(52) U.S. Cl. .................. 524/401; 524/442; 524/544
(58) Field of Classification Search ............ 524/401, 524/544, 442
See application file for complete search history.

(56) References Cited

U.S. PATENT DOCUMENTS 5,310,714 A * 5/1994 Grasselli et al. ............ 502/64
6,013,724 A * 1/2000 Mizutani et al. ............ 524/588
6,291,576 B1 * 9/2001 Schmiegel .................. 524/544
6,635,341 B1 10/2003 Barancyk et al. ........... 428/323

FOREIGN PATENT DOCUMENTS

| EP | 0942052 A1 | 3/1998 |
| EP | 1035184 A1 | 10/1998 |
| EP | 1035184 A1 * | 9/2000 |
| JP | 2001172389 A | 6/2001 |
| JP | 2002003775 A1 | 1/2002 |
| JP | 2002-294154 A * | 10/2002 |
| JP | 2002294154 A | 10/2002 |
| JP | 2003020450 A | 1/2003 |

* cited by examiner

*Primary Examiner*—David W. Wu
*Assistant Examiner*—Henry S. Hu
(74) *Attorney, Agent, or Firm*—Thomas F. Roland

(57) ABSTRACT

The invention relates to a fluoropolymer resin-based composition useful as a stain resistant coating. The coating composition contains organosilicates and at least one water-scavenger, and has an extended pot life. Articles coated with the composition show superior weatherability, dirt shedding, and stain resistance, without a negative effect on gloss. The coating is especially useful on roofing materials, wall materials and other outdoor building materials.

15 Claims, No Drawings

STAIN RESISTANT COATING

FIELD OF THE INVENTION

The invention relates to a fluoropolymer resin-based composition useful as a stain resistant coating. The coating composition contains organosilicates and at least one water-scavenger, and has an extended pot life. Articles coated with the composition show superior weatherability, dirt shedding, and stain resistance—without a negative effect on gloss. The coating is especially useful on roofing materials, wall materials and other outdoor structural materials.

BACKGROUND OF THE INVENTION

The ability of painted exterior surfaces to remain relatively clean in appearance for long periods of exposure is a major performance issue in architectural coatings. Dirt has always caused problems for light-colored coil coated panels when they are used outside. This is especially important in areas of high pollution, where panels that initially start perfectly clean are soon transformed into dull and grimy surfaces by the action of dust or dirt. The dust and dirt are not removed by rainwater. It is reported that a building's appearance can be severely affected by adverse environmental conditions within just two months. Dirt is generally deposited on the surface of the coating as rainwater runs down it. The water drop falls away, leaving dirt, watermarks and unsightly streaks behind.

It has been shown that a hydrophilic surface may produce good dirt shedding. The hydrophilic coating resists dirt pickup since water can wet the surface and flow off more easily allowing dirt to be easily washed off by rainwater. This process is known as "self cleaning".

Coatings containing silicates have been shown to provide superior stain resistance. Such coatings are described, for example in EP0942052, JP2002294154, and JP01172389. Organosilicates have also been used with fluoropolymer resins to produce desirable coating compositions as described in JP02003775, JP2003020450, U.S. Pat. No. 6,635,341 and EP1035184. While the addition of silicate additives leads to good dirt and stain resistance, they have the problem of producing a paint having a short pot life.

An organosilicate works by a mechanism of stratification first, then hydrolysis with rain water in the surface. When the silicate additive is formulated in paint, the silicate will migrate to the surface of the coating along with solvent evaporation during baking.

When it rains, alkoxy-silyl groups at the surface are hydrolyzed and form silanol groups, increasing the hydrophilicity. Both the migration and hydrolysis rates are crucial to the better dirt shedding performance. Since the organosilicate additives are hydrolytically sensitive materials, the hydrolysis and the condensation cross-linking reaction occurring in the paints will prevent silicates from migrating into the surface during baking, hindering generation of a more hydrolytic surface. If the hydrolysis rate is too low, a hydrophilic surface is hard to obtain. If it is too fast, the paint pot life will be very short.

Presently, the pot life of a paint or coating is only 1–2 days after an organosilicate is added into the formulations. Anything not used the same day has to be thrown out making the process very expensive. In addition, the initial gloss of a coated panel will be negatively affected by the addition of the silicate. Also, cracking problems could arise due to the cross-linking reaction between the additives.

Surprisingly it has been found that the addition of selected organo-silicate additives to a fluoropolymer coating composition, along with at least one water-scavenger, results in prolonged coating pot life. The hydrolysis and condensation reaction of the organosilicate additives are controlled to produce optimum properties. The coating composition forms a coating having superior weatherability and good dirt shedding performance, without a negative effect on gloss or other coating properties.

SUMMARY OF THE INVENTION

It is an object of the present invention to increase the pot life of a coating composition containing a fluoropolymer and an organosilicate.

It is another object of the present invention to produce a coating composition having good stain resistance and weatherability, without negatively effecting the gloss.

Accordingly, the present invention discloses a fluoropolymer resin-based coating composition having extended pot life and capable of forming a coating having superior weatherability, and stain resistance comprising:

a) at least 30 percent by weight of at least one fluoropolymer;

b) from 0.1 to 20 percent by weight of at least one organosilicate; and c) from 0.1 to 40 weight percent at least one water scavenger, all percentages based on the total resin solids content of the composition.

DESCRIPTION OF THE INVENTION

The coating composition of the invention contains three required components: a fluoropolymer resin, a selected organosilicate, and a water scavenger, along with optional components.

The base resin of the coating composition is a fluoropolymer resin. The fluoropolymer could be any polymer having fluorine functionality. Examples of such polymers include, but are not limited to fluoroolefins, vinylidene difluoride-based polymers, fluoroethylene vinyl ethers. The fluoropolymer may be a thermoplastic or thermoset polymer.

Preferably, the fluoropolymer resin is a vinylidene difluoride-based polymer and, more preferably a polyvinylidene fluoride (PVDF). The composition generally also includes a thermoplastic acrylic or a combination of a hydroxyl functional polymer and a curing agent such as melamines, isocyanates designed to wet pigment and improve the adhesion of the resulting film. The film forming fluoropolymer resin typically includes PVDF having a Mw of about 150,000 to about 450,000 and a melting point of about 150–170° C. One example of a commercially available PVDF which is particularly suitable for use in the present composition is KYNAR® 500 (available form ATOFINA Chemical Inc.). A vinylidene difluoride-based polymer preferably makes up at least about 30 weight percent of the resin solids, more preferably at least 50 weight percent, and most preferably 70 to 80 weight percent.

In a preferred embodiment, the coating composition contains a fluoropolymer resin and at least one acrylic resin. The acrylic resin must be thermodynamically miscible with the fluoropolymer. Useful acrylic resins include, but are not limited to polymers and copolymers made from methyl methacrylate, methyl acrylate, and ethyl acrylate monomers. The acrylic resin is needed when the fluoropolymer is polyvinylidene fluoride in order to add some degree of functionality and therefore wetability and adhesion to the coating composition. The acrylic resin is present at from 10 to 70 percent by weight, based on the total resin, and preferably from 20 to 30 percent by weight. The acrylic resin is blended with the fluoropolymer by means known in the art.

The organosilicate useful in the present invention is selected to optimize the balance of good dirt shedding performance and longer pot life. The organosilicate may be a mixture of organosilicates. The molecular weight of the organosilicate is critical to achieving the wettability of the coating surface. The silicates useful in the invention have low molecular weight, as they must be able to migrate to the surface. The molecular weight of the additive should be adapted to the exact system (binder, bake conditions, etc) to control the compatibility that will result in a thin layer of cross-linked silicone on the surface. The Mw of the organosilicate(s) is in the range of 600 and 20,000, and preferably from 600–5,000. Neither lower molecular weight nor higher molecular weight showed good performance. If the Mw is too low, the good compatibility makes it hard to migrate and a hydrophilic surface cannot be obtained. If the Mw it is too high, the migration will be slow and difficult.

The composition of the organosilicate is critical to balancing the paint pot life and dirt shedding performance. Since the general soiling happens rapidly over the first couple of months, a fast hydrolysis is very important to dirt shedding. However, if the hydrolysis and condensation reaction occurs too quick, the silicate will hydrolyze and a gel would form in the paint before application. The higher viscosity produced would make application more difficult and the dirt shedding property would be negatively affected since the cross-linked silicate will have difficulty in migration. Useful organosilicates include methyl silicate, ethyl silicate, methylethyl silicate and methylpropyl silicate. Methyl silicate produces a hydrophilic surface, but has a relatively short pot life. Hydrolysis retarders can be added to improve the pot life. Ethyl silicate produces a longer pot life, but hydrolysis is rather slow. The slow hydrolysis of ethyl silicate in a formulation may be hastened by the addition of an acid catalyst. In a preferred embodiment, ethylmethyl hybrid silicates provide both desirable hydrophilization efficiency and the good paint pot life. An example of commercially available ethyl methyl silicate which is particularly suitable for use in the present composition is EMS485 (available from Colcoat Co. Ltd, Japan).

The organosilicate(s) are used in the coating composition in the range of from 0.1 to 20 weight percent and preferably from 2–10 weight percent based on the total resin solids. If it is less than 0.1 weight percent is used, the generated wettability is not sufficient. At greater than 20 weight percent, the coating external appearance and ease of fabrication decreases, and cracking may occur.

At least one water scavenger is included in the coating composition to extend the pot life and maintain a high initial gloss. The silicate additives are hydrolytically sensitive materials, and the water-scavenger decreases the hydrolysis and condensation reactions between water and the organosilicate during storage, thereby increasing the pot life. Gelling due to hydrolysis and condensation reactions during storage is prevented or reduced by the water scavenger, enabling the organosilicates to migrate into the surface during baking to produce a hydrophilic surface. Additionally, coating gloss can decrease due to the silicate additives, and it was found that the addition of a water-scavenger reduced this gloss decrease. Examples of water scavengers useful in the present invention include, but are not limited to molecular sieves, triorgano phosphates, triorganoamines, heteroaromatic nitrogen compounds, carbodiimides, anhydrides sauch as maleic, succininic, itaconic; gypsum, zeolites, alumina, orthoesters, isocyanates, orthoboric esters, synthetic clays, and mixtures thereof. In a preferred embodiment, molecular sieves are used as the water scavenger. The molecular sieves must be activated by heating before use. The combination use of silicate with water scavenger leads to superior dirt shedding property, longer pot life and stable gloss in the same time. The water scavenger is used in the coating composition at from 0.1 to 40 weight percent, based on total resin solids. The amount of water scavenger used depends partly on the water scavenger used, as the effectiveness is different for each.

In addition to the fluoropolymer resin, organosilicate and water-scavenger components, the coating composition may optionally include other additives known in the coating art.

Optional components may include, but are not limited to, coloring pigment, extender, anti-settling agents, leveling agents, thickeners, and cross-linking agents.

The coating composition may include an acid catalyst to speed up the hydrolysis of some organosilicates, such as ethyl silicate described above. The acid catalyst may be selected from any acid including, but not limited to diluted hydrochloride acid, ortho fomic acid trialkyl, ortho acetic acid trialkyl, and ortho boric acid trialkyl. The acid catalyst, if present, is in the range of 0.1–10.0 weight percent, based on the amount of silicate. When the methyl silicates or ethyl methyl hybrid silicates are used, the acid is not required, but when the ethyl silicates are used, an acid catalyst is required for the faster hydrolysis of silicates.

In order to achieve better dirt shedding performance and longer paint pot life, any alcohol solvents must be kept out of the paint compositions.

The coating composition may be either a solvent-based composition or a powder coating. The coating composition of the present invention may be prepared by conventional methods. For example, the coating composition may be prepared by blending the various components using a disperser and milling equipment such as a small media mill or paint shaker. Regarding the paint composition containing bead molecular sieves, the bead molecular sieves should be filtered out before applying.

The coating composition of the invention, comprising a fluoropolymer resin, a selected organosilicate(s) and at least one water scavenger, produces a composition in which the hydrolysis and condensation reaction of the silicate additives are controlled, resulting in a good balance of the hydrolysis of silicate additive and pot life of the coating. As a result, the paint composition in this invention is capable of providing quicker hydrophilization, better dirt shedding performance and higher gloss in the coating.

Pot life of the coating composition following organosilicate addition is extended far beyond the one-day pot life of current technology. Therefore, the paint mixture that was not used the same day does not have to be thrown out. Dirt deposited on the resulting coating surface is quickly and immediately washed away with rainfall, providing better dirt shedding performance than the current technology. The coating gloss is not negatively affected, even for the paints containing silicate additives after long term storage.

The coating composition of the present invention may be used for coating architectural and industrial substrates, including, but not limited to, wood, metal, thermoplastic, glass, and metal substrates. Substrates exposed to the environment especially benefit from such coating. In one embodiment, the coating composition is deposited onto a metal surface, either in the form of a powder or liquid by means known in the art, such as, but not limited to, spraying, brushing, electrostatic coating, dipping, roll coating, coil coating, and bar coating. The fluoropolymer film is then cured to form a coated substrate having an adhered polymer film. Curing can be done by air drying, heating, UV cure, IR cure, and other means known in the art. The baking temperatures are not critical, but must be high enough to cause the fluoropolymer particles present in the dispersion to coalesce into a continuous film. A temperature of at least about 210° C. for about 10 minutes is generally adequate for PVDF dispersion coatings. In coil coating processes, the oven dwell temperature is often no more than about 50 seconds and oven temperatures as high as 300° C. may be used. Vinylidene difluoride-based films are preferably cured by baking for a well time of about 30–60 seconds such that the metal substrate reaches a peak metal temperature of 225° C. to 260° C.

The following examples are intended to illustrate further various aspects of the present invention, but are not intended to limit the scope of the invention in any aspect.

EXAMPLES

Working examples 1–5 and comparative examples 1–3 demonstrate that selected silicates provide both good dirt shedding performance and longer pot life. Working examples 6–7 and comparative examples 4–6 address the gloss issue and water scavenger. With the selected silicates, the water scavenger is required to prevent the loss of coating gloss caused by the addition of the silicates and to provide longer storage time. The combined use of selected silicates and water scavengers provides superior dirt shedding, longer pot life, and stable gloss.

wire-wrapped draw down rods (#52). The resulting films and panels were baked in a ventilated oven at 585° F. for 50 seconds. The panels were quenched in a cold-water bath. In order to test pot life, all paints were stored at room temperature for one month and then at 50° C. for two weeks followed by casting film with wire-wrapped draw down rods (#52). The films were prepared under the same conditions as the above procedure for the fresh paints. The panels made from both fresh paints and 1.5 months old paints were exposed outdoor for two weeks. The hydrophilicity was evaluated by measuring contact angle of the exposed panels with water. The evaluation results are shown in Table 2. For good results, water contact angle should be 50 or below.

TABLE 1

| | MS51 | MS56 | EMS485 | ES48 |
|---|---|---|---|---|
| Chemical | Methyl polysilicate | Methyl polysilicate | Ethyl methyl polysilicate | Ethyl polysilicate |
| Supplier | Mitsubishi Chemical Corp | | Colcoat Co. Ltd | |
| Appearance | Colorless transparent liquid | | Light Yellow transparent liquid | |
| Speccific Gravity (g/cc) | 1.15–1.25 | 1.20–1.30 | 1.15–1.20 | 1.13–1.17 |
| Viscosity mP · s | 4–10 | 15–45 | 5.0–30 | 15–45 |
| Si content as $SiO_2$ wt % | 51–53 | 55.5–57.5 | 48–53 | 47–49 |
| Mw | 500–700 | 1100–1300 | 1100–1500 | 1100–1300 |

TABLE 2

| | No. | Silicate additive grade | Silicate additive content (g) | Acid catalyst triethylborate (g) | fresh paints (<8 hrs) Water contact angle initial | fresh paints (<8 hrs) Water contact angle 2 weeks outdoor | old paints (1.5 months old) Water contact angle initial | old paints (1.5 months old) Water contact angle 2 weeks outdoor |
|---|---|---|---|---|---|---|---|---|
| Working example | 1 | EMS485 | 3 | 0 | 82 | 48 | 77 | 49 |
| | 2 | EMS485 | 3 | 0.3 | 57 | 37 | 67 | 46 |
| | 3 | ES48 | 3 | 0.3 | 78 | 48 | 78 | 50 |
| | 4 | MS56 | 3 | 0 | 68 | 50 | 60 | 61 |
| | 5 | MS56 | 3 | 0.3 | 54 | 38 | 60 | 72 |
| Comp. example | 1 | 0 | 0 | 0 | 79 | 78 | 78 | 77 |
| | 2 | MS51 | 3 | 0.3 | 62 | 61 | 72 | 74 |
| | 3 | ES48 | 3 | 0 | 89 | 61 | 89 | 60 |

Working Example 1–5 and Comparative Example 1–3

PVDF (trade name "KYNAR 500" supplied by ATOFINA Chem. Inc.) 20.5 g, Acrylic B44 (Rohm and Haas Paraloid B-44, supplied as a 40 wt % solution in toluene) 21.9 g, R960 TiO2 (supplied by DuPont) 15.8 g and various silicates 3.0 g were mixed together with 41.8 g Isophorone. Optionally in some case, 0.3 g of acid catalyst triethylborate (from Aldrich) was added, too. The physical data of various silicates were listed in Table 1.

The formulations were shaken 1 hour on a paint shaker with the aid of glass beads. The resulting fresh paints were then cast on chromated aluminum AA3003 substrates using After two weeks of outdoor exposure, the panels with water contact angles below 50 have good dirt shedding performance. The acid catalyst is required for faster hydrolysis when the ethyl silicate ES48 is used (working example 3 vs. Comparative example 3), but the catalyst is not required for the paint containing ethyl methyl silicate EMS 485 (working example 1).

Lower molecular weight is unfavorable to migration ability. MS51 (Mw: 500–700) (comparative 2) did not work well for white KYNAR 500 coatings even with the aid of acid catalyst. The fresh paint containing methyl silicate MS 56 is able to hydrophilize quickly even without the catalyst (Example 4). Silicate grade is critical to balancing the paint potlife and dirt shedding performance. Methyl silicate could make surface wet quickly, but the potlife is short. Ethyl silicate gave longer potlife, but slow hydrolysis. Ethyl methyl silicate showed the best performance.

Working Example 6–7 and Comparative Example 4–6

Working Example 6

PVDF (trade name "KYNAR 500" supplied by ATOFINA Chem. Inc.) 20.5 g, Acrylic B44 (Rohm and Haas Paraloid B-44, supplied as a 40 wt % solution in toluene) 21.9 g, R960 TiO2 (supplied by DuPont) 15.8 g, EMS485 3.0 g and 5 g bead molecular sieves were mixed together with 41.8 g isophorone.

Working Example 7

The paint composition was obtained in the same manner as in Working Example 6 except that the content of bead molecular sieves was changed as shown in Table 3.

Comparative Example 4

The paint composition was obtained in the same manner as in Working Example 6 except that there are no silicate additives and molecular sieve in comparative example 4.

Comparative Example 5

The paint composition was obtained in the same manner as in Working Example 6 except that there is no molecular sieve in comparative example 5.

Comparative Example 6

The paint composition was obtained in the same manner as in Working example 6 except that there is additional methyl alcohol in comparative example 6.

The formulations (see Table 3) were shaken 1 hour on a paint shaker with the aid of glass beads. The resulting fresh paints were then cast on chromated aluminum AA3003 substrates using wire-wrapped draw down rods (#52). The resulting films and panels were baked in a ventilated oven at 585° F. for 50 seconds. The panels were quenched in a cold-water bath. In order to test pot life, all paints were stored at room temperature for one month and then at 50° C. for two weeks followed by casting film with wire-wrapped draw down rods (#52). The films were prepared under the same conditions with the above procedure for the fresh paints.

The gloss of all the panels made from both fresh paints and 1.5 months old paints were read using a HunterLab ProGloss 3 (Geometry 60°). All panels were exposed outdoors in King of Prussia, Pa., USA for two weeks. The hydrophilicity was evaluated by measuring the water contact angle. For good results, the water contact angle should be at or below 50. In addition, all panels were also exposed in South Singapore (45° South) for 2 months to evaluate the dirt shedding performance. The dirt shedding performance was evaluated by measuring $\Delta E$ (overall color change from original) (soiling) of the panels which were exposed in Singapore for 2 months. Color was read using a HunterLab Labscan II; Geometry 0/45. The color reading is CIE L*a*b*, 10 degree observer, D65 illuminant. For good dirt shedding performance, $\Delta E$ should be less than 2. All evaluation results were shown in Table 4.

TABLE 3

| Example No. | Silicate additive | | Molecular sieve beads (g) | methanol (g) |
|---|---|---|---|---|
| | grade | Content (g) | | |
| Working example 6 | EMS485 | 3 | 5 | 0 |
| Working example 7 | EMS485 | 3 | 8 | 0 |
| Comparative example 4 | 0 | 0 | 0 | 0 |
| Comparative example 5 | EMS485 | 3 | 0 | 0 |
| Comparative example 6 | EMS485 | 3 | 5 | 5 |

TABLE 4

| | fresh paints (<8 hrs) | | | | old paints (1.5 month old) | | | |
|---|---|---|---|---|---|---|---|---|
| | Water contact angle | | | | Water contact angle | | | |
| No. | initial | 2 wks outdoor | $\Delta E$ (2 m Sgp) | Initial gloss | initial | 2 weeks outdoor | $\Delta E$ (2 m Sgp) | Initial gloss |
| 6 | 80 | 45 | 1.28 | 30 | 78 | 40 | 1.71 | 29 |
| 7 | 78 | 43 | Not determined | 28 | 76 | 42 | Not determined | 26 |
| 4 comp | 79 | 78 | 8.11 | 30 | 78 | 77 | 7.67 | 29 |
| 5 comp | 82 | 48 | 1.42 | 27 | 77 | 49 | 1.33 | 16 |
| 6 comp | 60 | 40 | 1.35 | 16.8 | 70 | 45 | 2.0 | 8.6 |

As seen from the results of working example 6 and 7, the combined use of silicate EMS485 and water scavenger leads to the superior dirt shedding performance ($\Delta E<2$) and longer pot life (1.5 months) as well as higher gloss in the same time. Without the water scavenger (comparative example 5), the good dirt shedding performance and longer pot life remained, but the gloss is reduced. However, if alcohol solvents are contained in the paint compositions, the initial gloss of coatings would be significantly reduced even in the presence of the water scavenger (comparative example 6). The alcohol solvents should be kept out of the paint compositions.

What is claimed is:

1. A fluoropolymer resin-based coating composition having extended pot life and capable of forming a hydrophilic surface coating having superior weatherability, and stain resistance comprising:

a) at least 30 percent by weight of at least one fluoropolymer;

b) from 0.1 to 20 percent by weight of at least one organosilicate; and
c) 0.1 to 40 percent by weight of at least one water scavenger, wherein said water scavenger is selected from the group consisting of molecular sieves, gypsum, zeolites, alumina, synthetic clays, and mixtures thereof;
all percentages based on the total resin solids content of the composition;
wherein said composition is free of alcohol-based solvents, and wherein said coating composition is in the form or a powder coating or a solvent-based coating.

2. The coating composition of claim 1 wherein said fluoropolymer comprises polyvinylidene fluoride.

3. The coating composition of claim 1 further comprising at least one acrylic resin.

4. The coating composition of claim 1 further comprising at least one acid catalyst.

5. The coating composition of claim 1 further comprising pigments, extenders, anti-settling agents, leveling agents, thickeners, or mixtures thereof.

6. The coating composition of claim 1 comprising at least 50 percent by weight of said fluoropolymer, based on the total resin solids content of the composition.

7. The coating composition of claim 6 comprising from 70 to 80 percent by weight of said fluoropolymer, based on the total resin solids content of the composition.

8. The coating composition of claim 1 comprising from 2 to 10 percent by weight of at least one organosilicate.

9. coating composition of claim 1 wherein said organosilicate is seleted from the group consisting of methyl-silicate, ethyl-silicate, propyl-silicate, ethyl-methyl silicate, and mixtures thereof.

10. The coating composition of claim 1 comprising ethylsilicate as the organosilicate and further comprising an acid catalyst.

11. The coating composition of claim 1 wherein said organosilicate has a weight average molecular weight of from 600 to 20,000.

12. The coating composition of claim 1 wherein said organosilicate has a weight average molecular weight of from 1,000 to 5,000.

13. The coating composition of claim 1 wherein said water scavenger comprises molecular sieves.

14. The coating composition of claim 4, wherein said acid catalyst is selected from the group consisting of diluted hydrochloride acid, ortho fomic acid trialkyl, ortho acetic acid trialkyl, ortho boric acid trialkyl, and mixtures thereof.

15. A method for increasing the pot-life of an organosilicate-containing coating composition capable of forming a hydrophilic surface comprising combining at least 30 percent by weight of at least one fluoropolymer, from 0.1 to 20 weight percent of an organosilicate selected from the group consisting of ethylsilicate, methylsilicate, methylethyl silicate and methylpropyl silicate, and mixtures thereof and from 0.1 to 40 percent by weight of at least one water scavenger, all percentages based on the total resin solids content of the composition, wherein said composition is free of alcohol-based solvents, and wherein said water scavenger is selected from the group consisting of molecular sieves, gypsun, zeolites, alumina, synthetic clays, and mixtures thereof, and wherein said coating composition is in the form of a solvent-based coating.

* * * * *